United States Patent
Weingarth et al.

(10) Patent No.: US 11,114,253 B2
(45) Date of Patent: Sep. 7, 2021

(54) ADDITIVE MATERIAL FOR AN ELECTRODE OF AN ELECTROCHEMICAL CELL, DOUBLE LAYER CAPACITOR AND PRODUCTION METHOD FOR SUCH AN ELECTRODE

(71) Applicant: HERAEUS BATTERY TECHNOLOGY GMBH, Hanau (DE)

(72) Inventors: Daniel Weingarth, Rodgau (DE); Julie Michaud-Bernlochner, Bonn (DE); Thomas Hucke, Aschaffenburg (DE); Dominik Samuelis, Bruchköbel (DE)

(73) Assignee: HERAEUS BATTERY TECHNOLOGY GMBH, Hanau (DE)

( * ) Notice: Subject to any disclaimer, the term of this patent is extended or adjusted under 35 U.S.C. 154(b) by 50 days.

(21) Appl. No.: 16/332,521

(22) PCT Filed: Sep. 5, 2017

(86) PCT No.: PCT/EP2017/072206
§ 371 (c)(1),
(2) Date: Mar. 12, 2019

(87) PCT Pub. No.: WO2018/046484
PCT Pub. Date: Mar. 15, 2018

(65) Prior Publication Data
US 2019/0237270 A1   Aug. 1, 2019

(30) Foreign Application Priority Data
Sep. 12, 2016 (EP) .................................. 16188414

(51) Int. Cl.
*H01G 11/38* (2013.01)
*H01G 11/24* (2013.01)
(Continued)

(52) U.S. Cl.
CPC ............. *H01G 11/38* (2013.01); *H01G 9/042* (2013.01); *H01G 11/24* (2013.01); *H01G 11/42* (2013.01);
(Continued)

(58) Field of Classification Search
CPC ........ H01G 11/52; H01G 9/155; H01G 11/12; H01G 11/26; H01G 11/28; H01G 11/72;
(Continued)

(56) References Cited

U.S. PATENT DOCUMENTS

| 5,393,619 A | 2/1995 | Mayer et al. |
| 2005/0287421 A1 | 12/2005 | Simon et al. |

(Continued)

FOREIGN PATENT DOCUMENTS

| EP | 2755262 | 7/2014 |
| KR | 10-2005-0116171 | 12/2005 |

OTHER PUBLICATIONS

Drobny et al., "Methods for Manufacturing Carbon Electrodes for Supercapacitors: Pros and Cons", Proc NAP, 2013, 2(4), 04NEA17(2pp).
(Continued)

*Primary Examiner* — Michael P Mcfadden
(74) *Attorney, Agent, or Firm* — Stradley Ronon Stevens & Young, LLP

(57) ABSTRACT

Additive material for an electrode of an electrochemical cell, double-layer capacitor and production method for such an electrode. Known additive materials for an electrode of an electrochemical cell contain electrically conductive particles composed of carbon, such as e.g. conductive carbon blacks or graphites. To provide an additive material having comparatively high ionic conductivity starting therefrom, it is proposed that the carbon additive particles have an average particle diameter in the range of 1 to 20 μm and contain
(Continued)

Figure 1:
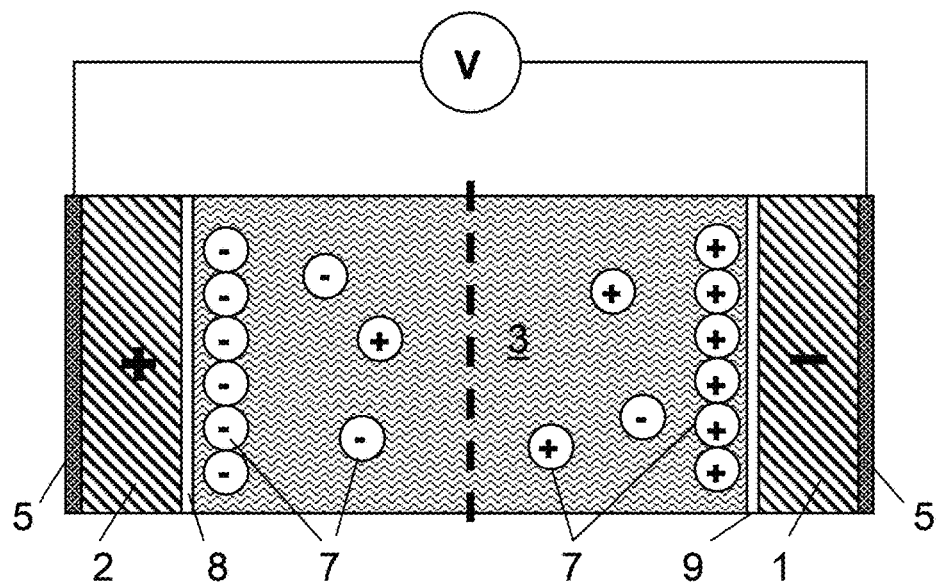

mesopores and macropores which form a three-dimensionally interconnected pore structure.

19 Claims, 3 Drawing Sheets

(51) Int. Cl.
*H01G 11/42* (2013.01)
*H01M 4/62* (2006.01)
*H01M 10/0525* (2010.01)
*H01M 4/133* (2010.01)
*H01G 9/042* (2006.01)
*H01G 11/52* (2013.01)
*H01G 11/86* (2013.01)
*H01M 4/587* (2010.01)

(52) U.S. Cl.
CPC ............. *H01G 11/52* (2013.01); *H01G 11/86* (2013.01); *H01M 4/133* (2013.01); *H01M 4/625* (2013.01); *H01M 10/0525* (2013.01); *H01M 4/587* (2013.01); *Y02E 60/13* (2013.01)

(58) Field of Classification Search
CPC ........ H01G 11/82; H01G 11/84; H01G 11/86; H01G 11/54; H01G 11/06; H01G 11/32; H01G 11/50; Y02E 60/13
See application file for complete search history.

(56) References Cited

U.S. PATENT DOCUMENTS

| | | | |
|---|---|---|---|
| 2008/0011986 A1* | 1/2008 | Yamakawa | H01G 11/32 252/500 |
| 2008/0117562 A1* | 5/2008 | Maruyama | H01G 11/48 361/502 |
| 2009/0196816 A1 | 8/2009 | Yamamoto et al. | |
| 2010/0238606 A1* | 9/2010 | Dreissig | H01G 9/058 361/502 |
| 2012/0134070 A1* | 5/2012 | Gadkaree | C01B 32/342 361/502 |
| 2014/0118884 A1 | 5/2014 | Lin et al. | |
| 2015/0138693 A1* | 5/2015 | Norieda | H01G 11/46 361/502 |
| 2015/0162139 A1 | 6/2015 | Lin et al. | |
| 2016/0060125 A1* | 3/2016 | Chung | H01G 11/86 429/231.8 |
| 2016/0104584 A1* | 4/2016 | Jiang | H01G 11/52 361/502 |

OTHER PUBLICATIONS

International Search Report and Written Opinion for PCT Application PCT/EP2017/072206.

Jackel et al., "Comparison of carbon onions and carbon blacks as conductive additives for carbon supercapacitors in organic electrolytes", Journal of Power Sources, 2014, 272, pp. 1122-1133.

Weingarth et al., "Carbon additives for electrical double layer capacitor electrodes", Journal of Power Sources, 2014, 226, pp. 475-480.

Office Action dated Jun. 15, 2020 mailed by the Korean Intellectual Property Office for counterpart Korean Patent application No. 10-2019-7007396 (with English translation of office action attached).

* cited by examiner

US 11,114,253 B2

ADDITIVE MATERIAL FOR AN ELECTRODE OF AN ELECTROCHEMICAL CELL, DOUBLE LAYER CAPACITOR AND PRODUCTION METHOD FOR SUCH AN ELECTRODE

CROSS REFERENCE TO RELATED APPLICATIONS

This application is a U.S. National Phase filing of international patent application number PCT/EP2017/072206 filed Sep. 5, 2017 that claims the priority of European patent application number 16188414.3 filed Sep. 12, 2016. The disclosures of these applications are hereby incorporated by reference in their entirety.

TECHNICAL FIELD

This disclosure relates to an additive material for an electrode of an electrochemical cell, containing electrically conductive particles composed of carbon.

Certain embodiments relate to an electrochemical double-layer capacitor in which two electrodes are arranged at a distance from each other, provided with electrical connections, separated by a separator and wetted by an electrolyte, wherein at least one of the electrodes contains a microporous carbon, an active material, an additive material composed of electrically conductive carbon additive particles and a binder.

A method of producing an electrode for an electrochemical double-layer capacitor is also disclosed. The method includes starting substances for an active material, an additive material, and a binder which are processed to form a paste. The paste is then processed to form a layer of the electrode material.

Specific uses of the additive material are also disclosed.

BACKGROUND

An electrochemical cell as disclosed herein is part of an electrochemical-based rechargeable storage device for electrical energy. Known energy storage devices are accumulators. Examples of accumulators are lead-sulfur, nickel-lithium, nickel-cadmium, lithium-sulfur or redox flow batteries (flow batteries), fuel cells, and capacitors. Capacitors store electrical energy not in a chemical form but in an electrical field between the capacitor plates.

A particularly interesting type of energy storage capacitors are electrochemical double-layer capacitors (Electric Double Layer Capacitors; EDLC). Electric Double Layer Capacitors are employed as energy storage devices, for example, in electric vehicles. Electric Double Layer Capacitors are also used as buffer capacitors for electronic circuits, and may be referred to as "supercapacitors" or "supercaps". The energy storage mechanism is based on a potential-controlled formation of Helmholtz double layers with a high charge capacity and reversibility on electrically conductive electrode surfaces composed of highly porous carbon in a liquid electrolyte.

When the double-layer capacitor is being charged, electrically charged ions in the electrolyte migrate to the respective electrode of the so-called active material of opposite polarity. There, they form a thin dielectric only a few molecular layers thick. The opposing layers that form in this way have opposite charges and are separated by an electrolyte-soaked separator. This corresponds to a series connection of two capacitors. During discharge, the ion transport changes direction and the ions that were previously enclosed in the pores of the electrodes leave the electrode material and pass back into the electrolyte. The electrolyte thus acts as an ion transport medium both in the separator, which is permeable to the ions, and within the electrodes.

Double-layer capacitors are distinguished by high rate capability and long service life. They can withstand up to 100,000 charging cycles. Compared with batteries, however, double-layer capacitors have a low energy density and a very low equivalent series resistance (ESR).

The electrochemical performance of double-layer capacitors largely depends on the electrode material. The electrodes generally consist of carbon with high porosity and a large internal surface area. The high-porosity carbon provides the electrode surface area required for charging and is also referred to as the "active material". Common active materials are activated carbon, graphenes, carbide-derived carbons, carbon black, carbon nanotubes, carbon onions and mixtures thereof.

For example, US 2016/0060125 A1 describes such an electrode material for a rechargeable storage device for electrical energy, and in particular for a lithium-ion capacitor. The electrode material consists of carbon particles with a core-shell structure composed of two different types of carbon. A preferred type of carbon for the core is synthetic graphite powder. A shell layer, preferably composed of nitrogen-containing polymer, is applied to the carbon core and then carbonized. The carbon composite powder produced in this way is distinguished by an average particle diameter in the range of 1 to 30 µm, a pore volume created by macropores in the range of 0.02-0.2 $cm^3/g$, a pore volume created by mesopores in the range of 0.001-0.05 $cm^3/g$ and a specific surface area in the range of 1 to 50 $m^2/g$.

US 2009/0196816 A1 also describes a carbon-based electrode material for a lithium-ion battery in the form of carbon particles with a core-shell structure. The core consists of natural graphite and the shell of turbostratic carbon. For its production, graphite powder is dry-mixed with pitch powder and the mixture is heated so that the pitch melts and fills micropores close to the surface of the graphite, carbonizing to form turbostratic carbon. The volume ratio V2/V1 of macropores (50-200 nm) and mesopores (2-50 nm) is 1 or higher. The average diameter of the carbon particles is 5 to 30 µm.

US 2005/0287421 A1 describes an electrochemical cell with a monolithic aerogel carbon cathode. The aerogel is produced by pyrolysis of a phenol-aldehyde resin. Of its total porosity, 70 to 90 vol. % is due to macropores and mesopores. The specific surface area of the pores with a pore size of more than 2 nm is in the range of 30 to 100 $m^2/g$.

A further carbon material for a lithium-ion secondary battery is known from EP 2755262 A1. It likewise comprises graphite as the main component in a proportion of 55 to 95 wt. %. In addition, the electrode material contains a graphitized carbon in a proportion by weight in the range of 5 to 45 wt. %.

By adding a binder and an additive, the electrical conductivity, rate capability and total output of the electrode material and of the double-layer capacitor can be optimized overall.

An overview of additive materials for electrodes of double-layer capacitors is given by the paper "Comparison of carbon onions and carbon blacks as conductive additives for carbon supercapacitors in organic electrolytes", by N. Jäckel, D. Weingarth, M. Zeiger, M. Aslan, I. Grobelsek, V. Presser; Journal of Power Sources; Vol. 272 (25 Dec. 2014); pages 1122-1133. Graphite nanomaterials, such as carbon nanotubes, are described as additive materials and in particular the effects of so-called "carbon onions" on the energy performance are investigated. Carbon onions are a variation of the so-called "fullerenes"—a carbon modification with a graphite layer curved into a sphere—in which multiple spherical shells with different radii are nested one inside another like the layers of an onion. Both carbon nanotubes and carbon onions are highly complex to produce and therefore comparatively expensive.

This cost disadvantage is not shared by highly electrically conductive carbon blacks (conductive carbon blacks), which are among the most widely used conductive additives for the electrode material of double-layer capacitors (see also D. Weingarth, D. Cericola, F. C. F Mornaghini, T. Hucke, R. Kötz, "Carbon additives for electrical double layer capacitor electrodes", Journal of Power Sources 266 (2014), 475-480). Conductive carbon black particles typically have diameters in the range of 30 to 50 nm and a specific surface area of less than 100 $m^2/g$. The quantity of this conductive additive is about 5 wt. %, depending on the specific requirements of the application in terms of output and energy performance.

To produce the double-layer capacitors, powdered starting substances for the additive material and for the active material are generally processed together with a binder and a dispersant to form a more or less viscous paste. This paste is brought to the target thickness in the moist state and dried to form a layer of the electrode material (see also D. M. Drobny, S. A. Tychyna, Y. A. Maletin, N. G. Stryzhakova, S. A. Zelinsky, "Methods for Manufacturing Carbon Electrodes for Supercapacitors: Pros and Cons", Proceedings of the International Conference Nanomaterials: Applications and Properties 2(4) (2013) 04NEA17). The layer of the electrode material coupled with a power connection forms the electrode or part thereof.

An important quality criterion for double-layer capacitors is the gravimetric energy density. This specifies the amount of energy that can be stored per unit of mass. To increase the energy density, the electrodes can be made thicker so that the proportion of active material rises relative to the total weight of the cell. However, this increase in thickness leads to the problem that the ions have to travel a greater distance from one end of the electrode to the other which is associated with a longer charging period. To address this problem, the ionic conductivity in the electrode material has to be enhanced.

Another way of increasing the energy density involves compacting the electrode material, for example, by compression. As a result of compaction, the gaps between the active material particles diminish. While this compaction leads to a higher volumetric energy density and higher electrical conductivity, it also leads to lower ionic conductivity at the same time.

Thus there is a need for an additive material for the electrode of a cell of an electrochemical energy storage device, which has high ionic conductivity compared to conductive carbon blacks or graphites.

Furthermore, there is a need for a double-layer capacitor having both a high energy density compared to a double-layer capacitor without electrode additives, and a low charging time.

In addition, such double-layer capacitors should be inexpensive to produce.

SUMMARY

The above needs are met through by an additive material for an electrode comprising, consisting essentially of, or consisting of an electrically conductive carbon additive particle having an average particle diameter from 1 to 20 μm along with mesopores and macropores forming a three-dimensional pore structure of interconnected pores.

The term "additive material" here refers to a carbon-containing material which is added in small quantities to an electrode material for an electrochemical cell in order to increase the electrical conductivity thereof.

In contrast to the carbon additive particles for double-layer capacitors known from the prior art, which only serve to increase the electrical conductivity of the electrode material, the additive material disclosed herein contributes not only to electrical conductivity but also to ionic conduction. Compared to a double-layer capacitor without additive material, this leads to an increase in ionic conductivity together with high electrical conductivity.

The electrode material includes interconnected, open porosity of the carbon additive particles having a sufficiently high proportion of meso- and macropores. An interconnected electrolyte-filled pore network in the electrode material is responsible for the high ionic conductivity. Open porosity of a material is shown by the fact that it is absorbent, which can be demonstrated with the aid of a dye penetration test or by means of mercury porosimetry. An absence of open pores is assumed if the total porosity is less than 10%. Pore sizes—defined as the distance between opposite pore walls—in the nanometer range are generally divided into three categories: micropores (<2 nm), mesopores (2-50 nm) and macropores (>50 nm). In the carbon additive disclosed herein, the pore volume based on pores with pore sizes of 10 to 1000 nm is preferably more than 0.2 $cm^3/g$.

To increase the ionic conductivity, a suitable particle size of the carbon additive particles is required. Specifically, a narrow range from 1 and 20 μm for the average particle diameter. Carbon additive particles containing meso- and macropores which are ground to a particle size of less than 1 μm largely consist of carbon wall material that had previously surrounded meso- and macropores (prior to grinding). However, they contain little pore volume that is interconnected via pore channels which is suitable for the passage and forwarding of ions. The volume fraction of carbon additive particles can only be increased at the expense of the volume fraction of active material and therefore at the expense of the capacitance of the double-layer capacitor. In view of this, carbon additive particles with average particle diameters of more than 20 μm are unfavorable, since large particles occupy a large volume with a comparatively small external surface area. This makes it more difficult to form a closed phase composed of carbon additive particles in contact with each other within the electrode material compared to more finely divided carbon additive particles for the same volume fraction. This closed phase composed of carbon additive particles is also referred to below as a "network". It is desirable in terms of promoting both electrical and ionic conductivity to have a network of carbon additive particles that is, as far as possible, closed, since this contributes to the interconnected pore network in the electrode material, which leads to high ionic conductivity.

In a preferred embodiment of the additive material disclosed herein, the carbon additive particles have a specific BET (Brunauer, Emmett and Teller) surface area from 10 to 600 $m^2/g$ and preferably from 10 to 50 $m^2/g$, from 100 to 200 $m^2/g$, from 60 to 150 $m^2/g$ or from 400 to 600 $m^2/g$.

Depending on the specific intended use of the additive material disclosed herein, BET surface areas of different sizes have proved particularly suitable. For lithium-ion secondary batteries, for instance, a BET surface area from 10 to 50 m²/g is preferred. For double-layer capacitors, on the other hand, the preferred range for the BET surface area is from 10 and 200 m²/g and most particularly preferably from 60 to 150 m²/g. For additive material in lead accumulators, however, the preferred specific surface area tends to be higher, from 40 to 600 m²/g.

In view of the above, the additive material disclosed herein with a specific BET surface area from 400 to 600 m²/g is preferably used as an additive of an electrode plate in a sulfur-lead accumulator.

With a specific BET surface area from 60 to 150 m²/g, the additive material disclosed herein is preferably used as an additive of an electrode of a lithium-ion battery.

The electrodes of the electrochemical storage cell, in particular of the double-layer capacitor, consist of e.g. activated carbon, the specific surface area of which is generally in the range of 1500-2200 m²/g. The specific surface area of conductive carbon blacks is typically more than 60 m²/g, the use thereof leading to a reduction in capacitance of the storage cell. When using carbon additives as described herein, which likewise have a comparatively low specific surface area from 10 to 600 m²/g, it would be expected that the capacitance would also decrease. However, this effect was not observed. On the contrary, the use of the carbon additive disclosed herein with a BET surface area from 10 and 200 m²/g in a double-layer capacitor led to an increase in capacitance. This effect suggests improved material utilization through better binding and conduction on the part of the active material due to the additive.

In connection with this discovery, it has also proved particularly favorable if the carbon additive particles have a microporosity of less than 20%—based on a pore volume with pore sizes up to a maximum of 1000 nm.

The proportion of the overall surface area made up of surface area generated by micropores with a diameter of less than 2 nm is preferably as low as possible, since micropores are too small for the electrolyte molecules that transport the active material ions and form empty space, which is virtually unusable and which has an unfavorable effect on the volumetric and gravimetric energy density of the double-layer capacitor.

The levels of additive materials needed to achieve a closed carbon network of the additive material can be linked to a significant deterioration in properties, such as reduced capacitance, reduced mechanical strength, or poorer processability. In principle, therefore, the proportion of additive material is as low as possible but as high as necessary. With a view in particular to a network of carbon additive particles that is as far as possible closed together with the smallest possible volume fraction of additive material, it has proved useful if the carbon additive particles have an average particle diameter of less than 15 µm, preferably less than 10 µm and—in particular for lithium-ion storage cells—an average particle diameter of less than 5 µm.

In a particularly preferred embodiment of the additive material disclosed herein, the carbon additive particles have a total porosity from 60 to 85%, wherein the porosity of the carbon additive particles is defined by an average pore width from 250 to 700 nm and wherein for pores with a pore diameter of 10 to 1000 nm the cumulative pore volume is more than 0.2 cm³/g, preferably from 0.5 to 2.3 cm³/g, and particularly preferably pores from this range of pore sizes make up a cumulative pore volume of at least 1 cm³/g. The total pore volume of the porous carbon particles in such embodiments is dominated by macropores. A network of interconnected macropores is particularly advantageous for ionic conduction.

A double-layer capacitor having a high energy density and low charging time is achieved by adding additive material contains electrically conductive particles composed of carbon having an average particle diameter from 1 to 20 µm and containing mesopores and macropores forming a three-dimensional pore structure of interconnected pores.

The double-layer capacitor disclosed herein contains at least two electrodes arranged at a distance from each other, which are immersed in an electrolyte or which are at least wetted thereby. The electrodes are connected to electrical connections for current return and current supply, and between them a separator is arranged which is permeable to active material ions in the electrolyte. At least one of the electrodes consists of a microporous carbon, composed of e.g. activated carbon, which forms the skeleton of the electrode material and in which, moreover, the active material, an additive material composed of electrically conductive carbon additive particles and a binder, composed of e.g. a polymeric plastic, are contained.

The energy storage principle of the double-layer capacitor is based on charge storage in the double layers of the electrodes or (in addition thereto) on chemical reaction energy based on redox reactions of active material in so-called "pseudo-capacitors". By allowing redox processes, the energy efficiency can be increased.

In contrast to the double-layer capacitors known from the prior art with carbon additive particles in the form of electrically conductive carbon black or graphite, which only increase the electrical conductivity of the electrode material, at least one electrode of the double-layer capacitor disclosed herein contains an additive material composed of porous carbon, which additionally contributes to ionic conduction. This results in an increase in ionic conductivity compared to other additive materials and electrode materials without an additive material, while at the same time maintaining high electrical conductivity.

The additive material explained above is particularly suitable for this purpose. The above explanations about the additive material disclosed hereintherefore also apply to the double-layer capacitor embodiments disclosed herein.

The additive material contains electrically conductive particles composed of carbon having an average particle diameter from 1 to 20 µm. The pore volume is principally dominated by mesopores and macropores together forming a three-dimensionally interconnected pore structure. Pores with pore sizes of 10 to 1000 nm preferably make up a cumulative pore volume of more than 0.2 cm³/g, particularly preferably a cumulative pore volume from 0.5 to 2.3 cm³/g and most particularly preferably a cumulative pore volume of at least 1 cm³/g.

The electrode material includes an interconnected, open porosity of the carbon additive particles, which is ensured by a sufficiently high proportion of meso- and macropores. An interconnected, open pore network in the electrode material is responsible for the high ionic conductivity.

To increase the ionic conductivity, a suitable particle size of the carbon additive particles is required. Specifically, a narrow range from 1 and 20 µm for the average particle diameter is disclosed. Carbon additive particles containing meso- and macropores which are ground to a particle size of less than 1 µm largely consist only of carbon wall material which had previously surrounded meso- and macropores that were present prior to grinding. However, they contain little pore volume that is interconnected via pore channels, which is needed for the passage and forwarding of ions. The volume fraction of carbon additive particles can only be increased at the expense of the volume fraction of active material and therefore at the expense of the capacitance of the double-layer capacitor. In view of this, carbon additive particles with average particle diameters of more than 20 µm are unfavorable, since large particles occupy a large volume with a comparatively small external surface area. This makes it more difficult to form a closed phase composed of carbon additive particles in contact with each other within the electrode material compared to more finely divided carbon additive particles for the same volume fraction. This closed phase composed of carbon additive particles is also referred to below as a "network". It is desirable in terms of promoting both electrical and ionic conductivity to have a network of carbon additive particles that is, as far as possible, closed, since this contributes to the interconnected pore network in the electrode material, which leads to high ionic conductivity.

It has been shown that it is possible to achieve a homogeneous distribution and a network of carbon additive particles that is as closed as possible, together with the smallest possible volume fraction thereof, if the average particle size of the carbon additive particles is noticeably smaller than that of the active material particles. In view of this, the active material is preferably formed from primary particles having an average primary particle diameter which is larger than the average particle diameter of the carbon additive particles by at least a factor of 3, wherein the average primary particle diameter is no more than 30 µm.

In each case, the average particle diameter values correspond to the D50 value defined above.

In connection with this observation regarding particle size, it has proved particularly favorable if the average primary particle diameter of the active material particles is from 20 to 30 µm and the average particle diameter of the carbon additive particles is from 7 to 10 µm.

To keep the proportion of active material in the electrode material as high as possible, the proportion of the carbon additive particles is preferably limited to 4 to 7 wt. %.

This weight specification refers to the final total weight of the electrode material after carrying out any treatment associated with a weight loss, such as the drying of the electrode material.

In a particularly preferred embodiment of the double-layer capacitor disclosed herein, the electrode has an electrode layer with a thickness of at least 100 µm, preferably at least 150 µm.

This thickness specification refers to a dry and compacted layer applied to one side of a carrier, without taking account of the carrier itself. In a double-sided version, the total thickness of the two electrode layers is therefore preferably at least 100 µm and particularly preferably at least 300 µm. This is a comparatively high thickness of the electrode layer; standard thicknesses of electrode layers in industrially manufactured double-layer capacitors are 60 to 90 µm. The comparatively thick electrode layer makes it possible to provide a double-layer capacitor with particularly high gravimetric and volumetric energy density. The longer diffusion path from one end of the electrode to the other is compensated in certain embodiments of the double-layer capacitor disclosed herein by the high ionic conductivity of the additive material disclosed herein and, associated therewith, the high ionic conductivity of the electrode material. The better balancing and electrochemical homogeneity in the electrode due to the high ionic conductivity can be associated with a longer service life.

With regard to the production method for an electrode of a double-layer capacitor, the above-mentioned object is achieved starting from a method of the type mentioned at the beginning. Including the use of electrically conductive particles of carbon as the additive material, which particles have an average particle diameter from 1 to 20 µm and contain mesopores and macropores forming a three-dimensional pore structure of interconnected pores.

The three-dimensionally interconnected pore structure of the carbon additive particles is preferably achieved by their having a total porosity from 60 to 85% and an average pore width from 250 to 700 nm, wherein for pores with a pore diameter of 10 to 1000 nm the cumulative pore volume is more than 0.2 $cm^3/g$, preferably from 0.5 to 2.3 $cm^3/g$, and pores from this pore size range particularly preferably make up a cumulative pore volume of at least 1 $cm^3/g$.

In certain embodiments of the method disclosed herein, the skeleton of the electrode material, which may consist of activated carbon, is impregnated with active material, the additive material composed of electrically conductive carbon additive particles and a binder. In contrast to the electrodes known from the prior art with carbon additive particles in the form of electrically conductive carbon black or graphite, which only increase the electrical conductivity of the electrode material, in the method disclosed hereinan additive material composed of porous carbon is employed, which additionally contributes to ionic conduction. As a result, an increase in ionic conductivity is achieved compared to conductive carbon blacks while at the same time maintaining high electrical conductivity.

The additive material explained above is particularly suitable for producing an electrode. The electrode produced disclosed herein is part of an electrochemical cell, such as e.g. an accumulator or a capacitor. In particular, it can be employed in a double-layer capacitor. The above explanations about the additive material disclosed herein and the double-layer capacitor disclosed hereintherefore also apply to the production method disclosed herein.

Suitable binders are e.g. polyvinylidene fluoride (PVDF), a copolymer comprising polymer units, Teflon, polyvinyl difluoride, polyvinylpyrrolidone (PVP), carboxymethylcellulose and styrene-butadiene rubber.

DRAWING

Figure 2:
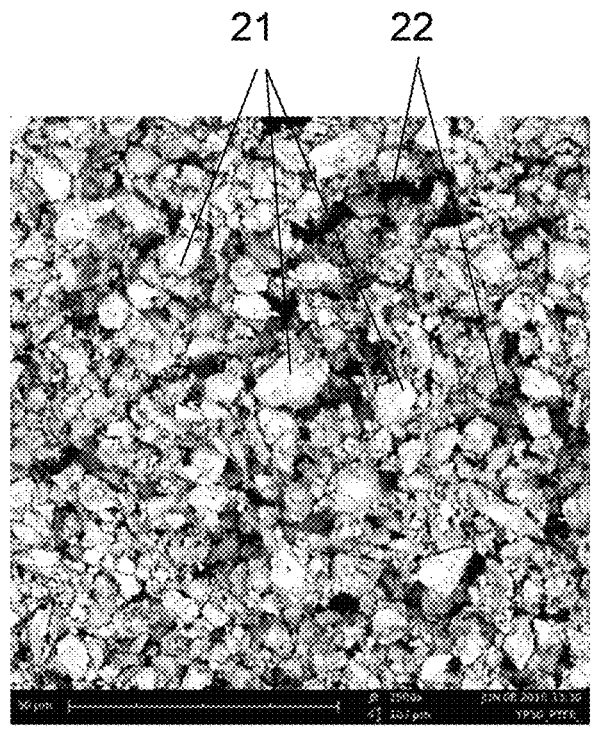
Figure 3:
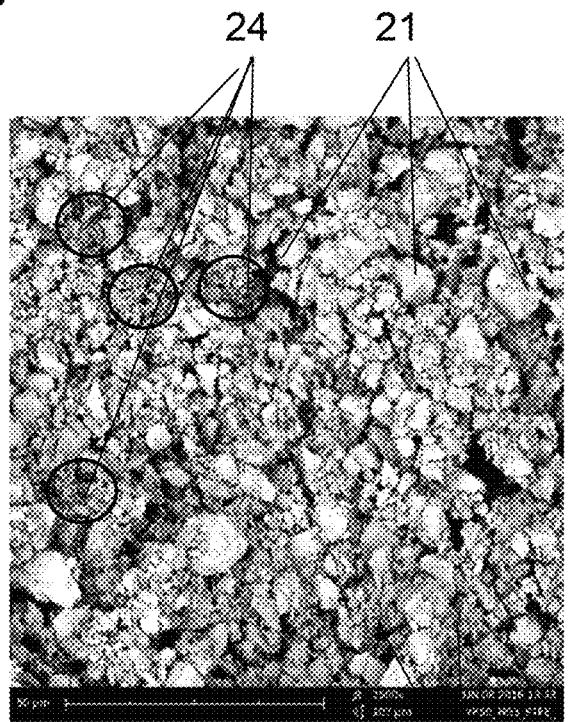
Figure 4:
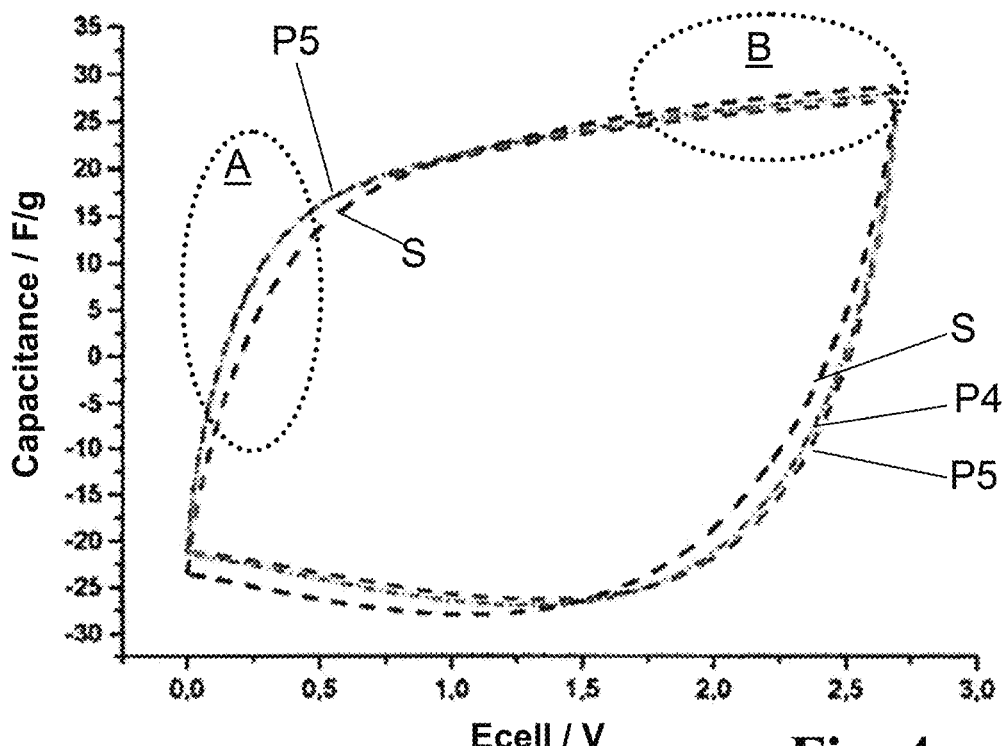
Figure 5:
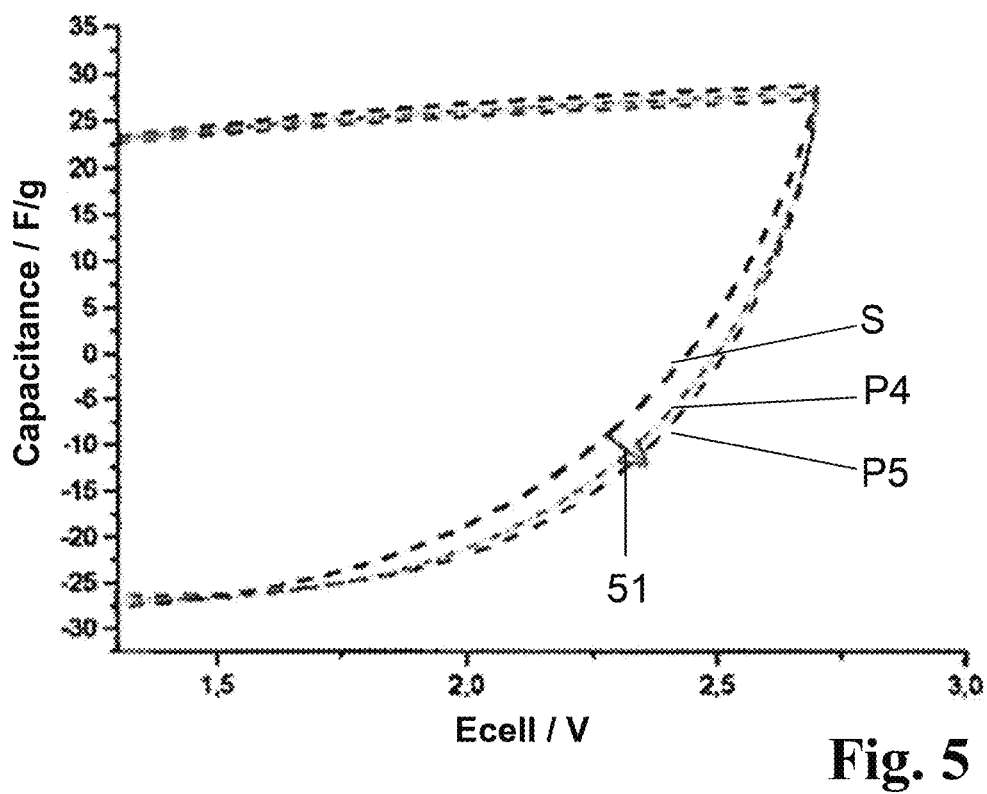
Figure 6:
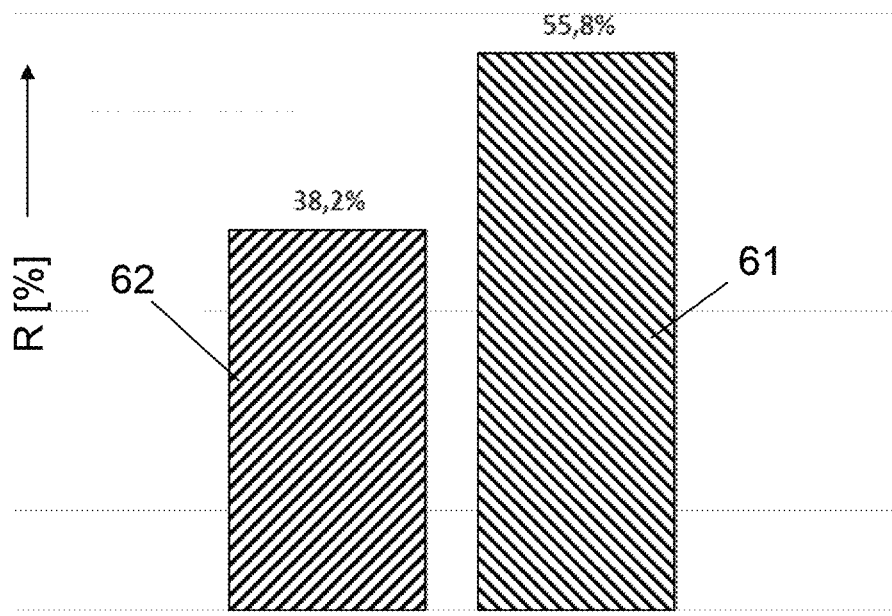
Figure 7:
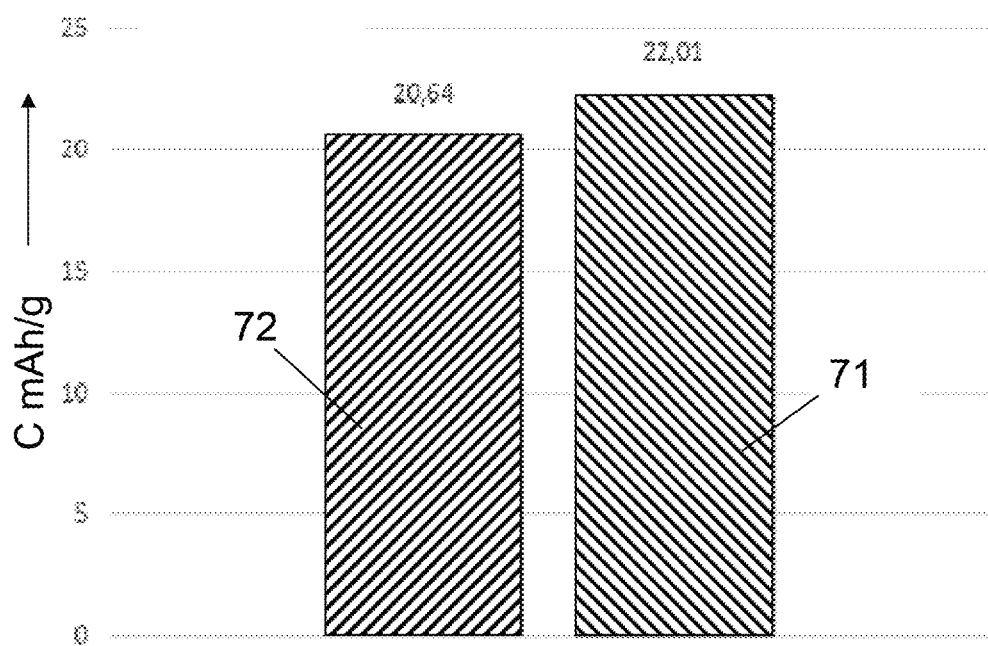

The disclosure is best understood from the following detailed description when read in connection with the accompanying drawing. Included in the drawing are the following figures:

FIG. 1 is a schematic illustration of a cell of a double-layer capacitor with anode, cathode and separator, FIG. 2 is a scanning electron microscope image of an electrode material without an additive, FIG. 3 is a scanning electron microscope image of an electrode material with an additive, FIG. 4 is a cyclic voltammograms of a conventional electrode with conductive carbon black as an additive compared with an electrode disclosed herein, FIG. 5 is an enlarged section of the voltammogram of FIG. 4, FIG. 6 is a result of a comparative measurement of rate stability, and FIG. 7 is a result of a comparative measurement of material utilization.

DESCRIPTION

The features and benefits of the disclosed electrode and additive material are illustrated and described by reference to exemplary embodiments. The disclosure also includes the drawing, in which like reference numbers refer to like elements throughout the various figures that comprise the drawing. This description of exemplary embodiments is intended to be read in connection with the accompanying drawing, which is to be considered part of the entire written description. Accordingly, the disclosure expressly should not be limited to such exemplary embodiments illustrating some possible non-limiting combinations of features that may exist alone or in other combinations of features.

Definitions and Test Methods

Individual parameters, method steps and terms in the above description as well as test methods are additionally defined below. The definitions are part of the description. In the event of a contradiction in content between one of the following definitions and the rest of the description, the wording in the description is definitive.

Where no test method is given for a parameter, the standard test method for this parameter should be applied and in particular the test method laid down in the appropriate ISO specification, the publication date of which is closest to that of the present application. If no test conditions are specified, standard conditions (SATP conditions) are deemed to be 298.15 K (25° C., 77° F.) for the temperature and 100 kPa (14.504 psi, 0.986 atm) for the absolute pressure.

Measurement of the Electrical Conductivity of the Additive Particles

The test specimen of the additive particles was compacted by uniaxial mechanical compression with a compression pressure of 75 kg/cm$^2$. An electric current was applied to the compacted test specimen using electrodes with gold-plated surfaces and the voltage drop was measured. From the measured value, the electrical resistance and thus the conductivity in S/cm were calculated. If the measured value determined in this way was more than 1 S/cm, the material of the test specimen was assessed as "electrically conductive".

Measurement of porosity, pore size, pore volume and specific surface area (BET-SSA)

The specific pore volume of a porous material refers to the free volume within the material occupied by hollow spaces. The pore volume and porosity were determined by mercury porosimetry in accordance with ISO15901-1 (2005). In this test, mercury is pressed into the pores of the porous material under the action of an external pressure against the opposing surface tension forces. The force needed is inversely proportional to the pore size and therefore, as well as the cumulative total pore volume, the pore size distribution of the specimen can also be determined.

The porosimeters used were a "ThermoFisher Scientific" PASCAL 140 (low pressure up to 4 bar) and PASCAL 440 (high pressure up to 4000 bar), each calibrated using porous glass beads with a pore diameter of 75 nm (obtained from: University of Leipzig, Germany, Faculty of Chemistry and Mineralogy, Institute of Chemical Technology). The mercury density was corrected for the actual temperature with the aid of the "Washburn method". The value for the surface tension was set at 0.484 N/m and for the contact angle at 141.1°. A specimen size of between approx. 30 and 40 mg was selected. Before starting a test, the test specimen was heated at 120° C. for 24 hours. The evacuation of the test specimen to an absolute pressure of 0.01 kPa was performed automatically by the instrument.

Mercury porosimetry only detects pore sizes greater than 2 nm (mesopores and macropores). The contribution of micropores (with pore sizes of less than 2 nm) to the porosity and specific surface area was determined by the V-t method by nitrogen absorption, with a sample being held at different pressures and 77 K. This method is similar to the BET method, with the pressure range being extended to higher pressures so that surface areas of the non-microporous part of the material are also recorded. It will be explained in more detail below with reference to surface metrology.

The specific surface area was measured on the basis of a sorption measurement by the Brunauer, Emmet and Teller method (BET method) based on DIN ISO 9277:1995. The measuring instrument was a "NOVA-3000" (from Quantachrome), which operates by the SMART method (Sorption Method with Adaptive Dosing Rate). SARM-13 and SARM-214 aluminum oxide from Quantachrome were used as reference materials. The saturation vapor pressure of nitrogen (N2 4.0) was determined and the test specimen was dried for 1 hour at 200° C. under vacuum. After cooling, the weight of the test specimen was determined and it was then degassed, evacuating to an absolute pressure of 200 mbar. In the pressure range in which monolayers and multiple layers of absorbed molecules form, the specific surface area (BET-SSA) was determined from the multilayer adsorption isotherms (BET isotherms) by the Brunauer, Emmett and Teller method. For meso- and macroporous materials, adsorption values with a relative pressure of less than 0.1 were used.

The size distribution of mesopores was derived from the desorption isotherms with reference to the BJH pore size model according to ISO15901-2 at relative pressures higher than 0.35. The empirical t-plot method according to ISO15901-3 at a relative pressure of more than 0.1 was used to determine pore surface area and pore volume, it being possible to differentiate between surface area contributions of micropores and the remaining porosity (mesopores, macropores and contributions of the external surface area). The SARM 2001 and 2004 SARM standards from Quantachrome were used as reference materials.

For the calculation, the mass of the specimen after degassing was used. Five measurements were evaluated and the average was given as the specific surface area in m$^2$/g. The dead volume of each test specimen was determined beforehand based on loading with helium gas (He 4.6, relative humidity 30 ppmv). The glass cuvettes were cooled on 77° K liquid nitrogen. The calculation was based on nitrogen $N_2$ 4.0 with a molecular cross-sectional area of 0.162 nm$^2$ at 77° K as adsorbate.

Particle Size Distribution

The particle size and particle size distribution were determined by laser diffraction on a dispersed specimen in accordance with ISO 13320. The measuring instrument used was a Mastersizer 3000 from Malvern, equipped with a He-Ne laser, a blue LED and a wet dispersion unit for measurements at ambient temperature (23° C.). The wet dispersion unit was set at an ultrasound power of 80% and water was used as the dispersant. The D50 values of the particle size distribution were determined with the aid of the 21 CFR device software with a form factor of 1. The D50 value here characterizes the particle size not reached by 50% of the cumulative particle volume (median value of the particle size).

Particle sizes of more than 315 μm and corresponding size distributions were determined by sieve analysis using an "Air Jet RHEWUM LPS 200 MC" sieving device (RHEWUM GmbH).

Exemplary Embodiment

FIG. 1 shows a diagram of the basic construction of a cell of a double-layer capacitor. In general, multiple cells of this type are electrically connected in series, e.g. in a stacked or wound arrangement.

The positively charged electrode 1 (cathode) and the negatively charged electrode 2 (anode) are immersed in an electrolyte 3, the molecules of which act as a carrier medium for an active material. Between the electrodes 1, 2, a separator 4 is arranged, which is permeable to the electrolyte molecules. On the outwardly facing electrode surfaces, electrical connection contacts 5 are attached, by which an electrical connection to a consumer 6 is made.

When the double-layer capacitor is being charged, the electrically charged ions 7 in the electrolyte 3 diffuse to the electrode of the opposite polarity and collect in the pores of the activated carbon structure. In this way, differently charged layers 8, 9 are formed at the electrodes 1, 2 which form the electrochemical double-layer capacitor by series interconnection with the aid of the electrolyte-soaked separator 4. During the discharging operation, the ion transport is reversed and the ions that were stored in the pores of the activated carbon of the electrodes 1, 2 migrate into the electrolyte 3, breaking down the charged layers 8, 9.

In the exemplary embodiment, the electrolyte is a 1M tetraethylammonium tetrafluoroborate (TEABF4) in an acetonitrile solution. The separator 6 is a non-electrically conducting, ion-permeable nonwoven glass fiber material from Whatman, type GF/A.

The electrodes 1, 2 comprise an activated carbon with predominantly micropores (type YP-50F from Kuraray Chemicals Co., Japan) with an average particle diameter from 20 to 40 µm, which represents the active material. The binder is polytetrafluoroethylene (PTFE).

The particulate additive material is dry-mixed with the activated carbon particles. These are carbon particles that are available from Heraeus Deutschland GmbH & Co. KG under the name "Porocarb"®. These carbon particles have a spherical morphology and an average diameter of less than 20 µm. They are distinguished by an open porosity in which meso- and macropores are interconnected via a three-dimensional network of channels. The three-dimensional network allows a particularly rapid penetration and diffusion of ions for charge transport. The pore sizes in the mesopore and macropore range of about 2 nm to 10 µm make up more than 80% of the volume of the carbon particles. A measurement of the specific internal surface area by the BET method gives measured values in the range of 10 to 60 m$^2$/g. The pore volume based on micropores is negligible.

In comparative tests, commercially available graphite particles were used instead of the meso- and macroporous carbon particles. The reasons for comparing the additive material according to the disclosure with graphite (and not with conductive carbon black) as the additive material lie in the fact that graphite (like conductive carbon black) has very good electrical conductivity but is also available in a similar particle size to the Porocarb® material and so similar electrode material densities to those obtained with the Porocarb material can be obtained using the graphite additive. The addition of conductive carbon black usually leads to reduced electrode densities, which makes it more difficult to draw a comparison as a lower density often leads to better ion transport with a lower energy density of the overall system.

The SEM image of FIG. 2 shows the electrode material without an additive material. Activated carbon particles 21 and interstices 22 can be seen.

The SEM image of FIG. 3 shows the electrode material with the additive material in the form of Porocarb® carbon particles 23. Owing to their comparatively small particle size of less than 20 µm, the additive material particles 23 are able to fill more or less completely the interstices 22 that were originally present between the activated carbon particles 21. The filling of the voids can be seen particularly well e.g. in the regions 24 that have been ringed.

Different variants of the Porocarb carbon particles were employed as additive materials, varying in particle size, BET surface area and porosity (total porosity, average pore width and pore volume of the pores with pore widths of between 10 and 1000 nm). In preliminary tests, mixtures of the specimens with active material were produced and their properties were determined in terms of density, porosity and electrical conductivity. The starting materials and test results are compiled in Table 1 by comparison with graphite (specimen D), the suitability of the respective sample material being given in the last column of the table as a qualitative measure "M".

TABLE 1

| Additive specimen | Particle diameter [µm] | Total porosity [%] | Average pore width [nm] | Pore volume (10-1000 nm) [cm$^3$/g] | ET surface area [m$^2$/g] | M |
|---|---|---|---|---|---|---|
| A | 8 | 82 | 450 | 1.2 | 31 | ++ |
| B | 3 | 80 | 450 | 1.6 | 45 | ++ |
| C | 15 | 85 | 160 | 2.1 | 150 | + |
| D | 6 | 20 | 100 | 0.2 | 3 | -- |
| E | 1 | 60 | 250 | 1 | 60 | 0 |
| F | 21 | 60 | 120 | 0.8 | 80 | -- |
| G | 20 | 85 | 150 | 2.0 | 150 | 0 |

The symbols for the qualitative evaluation in column "M" of Table 1 have the following meanings: "++": very good, "+": good, "0": acceptable, "−" poor and "−−" very poor.

The additive specimens D and F proved unfavorable here. In the case of specimen D (graphite as the additive material) the small particle diameter is associated with a low total porosity with a low pore fraction of meso- and macropores, so that no interconnected, open pore structure is present. In the case of specimen F, the large particle diameter led to an inadequate fit into the voids between the active material particles and a low density of the electrode material overall. Specimens E and G respectively proved to be just acceptable in this respect. The other specimens displayed good quality, with the carbon variant of specimen A showing the most promising properties in the preliminary tests.

To investigate the limits of usability, various mix ratios of active material and additive material were produced with additive specimen A and investigated with reference to capacitance and rate stability, and the results were compared with a commercially available carbon additive (graphite). The test results are compiled in Table 2:

TABLE 2

| Example | Additive material | Primary particle diameter of active material [µm] | Additive fraction in electrode material [wt. %] | Capacity [mAh/g$_{active\ material}$] | Rate stability [%] | Electrode layer thickness [µm] |
|---|---|---|---|---|---|---|
| 0 | — | 30 | 0 | 20.6 | 38 | 500 |
| 1 | Specimen A | 30 | 15 | 16.3 | 29 | 500 |
| 2 | Specimen A | 30 | 10 | 17.4 | 46.5 | 500 |
| 3 | Specimen A | 30 | 7.5 | 18.5 | 44.2 | 500 |
| 4 | Specimen A | 30 | 5 | 22 | 55.8 | 500 |

TABLE 2-continued

| Example | Additive material | Primary particle diameter of active material [μm] | Additive fraction in electrode material [wt. %] | Capacity [mAh/$g_{active\ material}$] | Rate stability [%] | Electrode layer thickness [μm] |
|---|---|---|---|---|---|---|
| 5 | Specimen A | 30 | 2.5 | 18.8 | 48 | 500 |
| 6 | Specimen B | 30 | 5 | 20.8 | 52 | 500 |
| 7 | Conductive carbon black | 30 | 5 | 18.7 | 51 | 500 |
| 8 | Graphite | 30 | 5 | 18.7 | 27 | 500 |

Production of Electrodes

Method 1: powders composed of the additive material and the active material were first premixed in the dry state in the respective ratio. They were then stirred in ethanol/isopropanol to form a slurry and the binder was added. The binder was an aqueous suspension with 60 wt. % PTFE. The slurry set with continuous stirring. The electrode layer in the moist state was then brought to the target thickness by rolling and was dried for at least 12 h.

In this method, a free-standing electrode layer without a current collector is obtained. It is not therefore exposed to any voltages due to adhesion to the current collector, and so electrode layers of more than 150 μm can be established.

Comparative method 2 (wet coating): a mixture of N-methylpyrrolidone and PVDF was employed as the binder here and a comparatively thin slurry was obtained. This was applied directly on to a current collector using the "doctor blade technique". In wet-coating processes on a laboratory scale, maximum dry coat thicknesses of 150 μm (one-sided) were achieved.

The electrode layers produced on the basis of method 1 above were stamped out in a defined shape. Two identical carbon electrode layers were arranged in an electrochemical coin cell and a separator film was inserted between them. The free-standing electrode layers also received a carbon-coated current collector for external bonding. The "electrode sandwich" was as follows: current collector electrode separator electrode current collector. The external electrical contacts were made via outer surfaces of coin cells. The cell was assembled in a glove box and filled with electrolyte (1M tetraethylammonium tetrafluoroborate in acetonitrile) before being hermetically sealed to avoid contamination with oxygen and water. The electrochemical behavior of the coin cell could then be measured.

FIG. 4 shows the result of cyclovoltammetric measurements. This involves applying a rising and then falling voltage to the coin cell with a potential scan rate ramp of 50 mV/s. The current strength for charging and discharging the electrodes is recorded. The specific capacitance can be obtained from the measured current strength by dividing by the charge/discharge ramp and the electrode mass.

In the voltammograms for three different test specimens in FIG. 4, the specific capacitance thus determined is plotted on the vertical axis against the voltage applied (in V). The cyclovoltammogram labelled "S" relates to Example 0 of Table 2 in which the carbon electrode does not contain an additive. The cyclovoltammogram labelled "P5" relates to Example 4 of Table 2, in which the carbon electrode contains the porous carbon "Porocarb" as an additive, and the cyclovoltammogram labelled "P4" relates to Example 6 of Table 2.

The voltammograms were each measured in the voltage range of between 0.0 and 2.7 V (reversal potential) of voltage applied to the cell at a scan rate of 50 mV/s.

The capacitance-voltage curves show characteristic regions A and B, which reflect the electrochemical behavior of the electrodes. The current increase in region A can be attributed to the speed at which the cell can be charged. The steeper this region, the more rapid the recharging of the cell. The surface integral over the entire region is a qualitative measure of the active surface area available. In region B, the system is viewed in the continuous charging process. This enables conclusions to be drawn about the actual capacitance away from the recharging processes. The higher the capacitance in this region, the greater the total capacitance of the system.

In the enlarged section of this voltammogram in FIG. 5, the directional arrow 51 indicates the energy gain of the cell according to the disclosure (curve P5) compared to the cell without an electrode additive (curve S). This effect can be attributed to the higher ion mobility that is obtained with the electrode additive disclosed herein.

This effect of the meso- and macroporous carbon particles as an electrode additive is also emphasized by the block diagrams of FIG. 6, which show the so-called rate stability for a double-layer capacitor disclosed herein (Example 4 of Table 2) compared to a conventional double-layer capacitor without an electrode additive (Example 0 of Table 2). The ratio of the capacitances of a cell during rapid discharge in 10 seconds (360C) to a slow discharge in 10 minutes (6C) is taken as the measure of rate stability R (in %) here. The higher the value of this ratio, the more rapidly the recharging takes place and the higher the ion mobility within the cell. It can be seen from FIG. 6 that, during rapid discharge (360C) of the cell 61 disclosed herein, about 56% of the capacitance during slow discharge (6C) is still achieved. In comparative specimen 62, on the other hand, there is a rate stability R of only about 38%.

The block diagram of FIG. 7 illustrates the improved material utilization explained above by the binding of the active material when the additive disclosed herein composed of Porocarb® material was used. The block height indicates the capacity C of the coin cell (in mAh per g of active material). According to this, a value of 20.06 mAh/g was measured for the capacity C in the comparative test cell 72 without an additive, and in the cell 71 according to the disclosure with an additive material fraction of 5 wt. % (Example 4 of Table 2), despite the correspondingly reduced fraction of active material, a value of 22.01 mAh/g was measured for the capacity C.

Although illustrated and described above with reference to certain specific embodiments, the present disclosure is nevertheless not intended to be limited to the details shown. Rather, various modifications may be made in the details within the scope and range of equivalents of the claims and without departing from the spirit of the disclosure. It is expressly intended, for example, that all ranges broadly recited in this document include within their scope all narrower ranges which fall within the broader ranges.

The invention claimed is:

1. A conductive additive material for an electrode of an electrochemical cell, the conductive additive material comprising:
electrically conductive carbon particles having an average particle diameter from 1 to 20 μm and mesopores and macropores defining a three-dimensional pore structure of interconnected pores, wherein pores with a pore diameter of 10 to 1000 nm make up a cumulative pore volume of more than 0.2 cm$^3$/g, wherein the carbon particles have a microporosity of less than 20% based on a pore volume with pore sizes up to a maximum of 1000 nm.

2. The conductive additive material according to claim 1, wherein the carbon particles have a specific BET surface area from 10 to 600 m$^2$/g.

3. The conductive additive material according to claim 1, wherein the carbon particles have an average particle diameter of less than 15 μm.

4. The conductive additive material according claim 1, wherein the carbon particles have a total porosity from 60 to 85%.

5. The conductive additive material according claim 1, wherein the porosity of the carbon particles is defined by an average pore width from 250 to 700 nm.

6. The conductive additive material according to claim 1, wherein the carbon particles have a specific BET surface area from 10 to 50 m$^2$/g.

7. The conductive additive material according to claim 1, wherein the carbon particles have a specific BET surface area from 100 to 200 m$^2$/g.

8. The conductive additive material according to claim 1, wherein the carbon particles have a specific BET surface area from 60 to 150 m$^2$/g.

9. The conductive additive material according to claim 1, wherein the carbon particles have a specific BET surface area from 400 to 600 m$^2$/g.

10. The conductive additive material according to claim 1, wherein the carbon particles have an average particle diameter of less than 10 μm.

11. The conductive additive material according to claim 1, wherein the carbon particles have an average particle diameter of less than 5 μm.

12. The conductive additive material according claim 1, wherein pores with a pore diameter of 10 to 1000 nm make up a cumulative pore volume from 0.5 to 2.3 cm$^3$/g.

13. The conductive additive material according claim 1, wherein pores with a pore diameter of 10 to 1000 nm make up a cumulative pore volume of at least 1 cm$^3$/g.

14. A double-layer capacitor comprising:
two electrodes: (i) arranged at a distance from each other, (ii) provided with electrical connections, (iii) separated by a separator, and (iv) wetted by an electrolyte;
at least one of the electrodes comprising:
a microporous carbon;
an active material;
a conductive additive material in an amount that is in the range of from 2.5 to 15% by weight of the electrode material, said conductive additive material comprising electrically conductive carbon particles having an average particle diameter from 1 to 20 μm and mesopores and macropores defining a three-dimensional pore structure of interconnected pores, wherein pores with a pore diameter of 10 to 1000 nm make up a cumulative pore volume of more than 0.2 cm$^3$/g, and wherein the carbon particles have a microporosity of less than 20% based on a pore volume with pore sizes up to a maximum of 1000 nm, and
a binder.

15. The double-layer capacitor according to claim 14, wherein the active material comprises primary particles having an average primary particle diameter which is larger than the average particle diameter of the carbon additive particles by at least a factor of 3 and the average primary particle diameter is no more than 30 μm.

16. The double-layer capacitor according to claim 15, wherein the average primary particle diameter of the active material particles is from 20 to 30 μm and the average particle diameter of the carbon particles is from 7 to 10 μm.

17. The double-layer capacitor according to claim 14, wherein the carbon particles comprise 4 to 7 wt. % of the electrode.

18. The double-layer capacitor according to claim 14, wherein at least one of the electrodes includes an electrode layer with a thickness of at least 100 μm.

19. A method of producing an electrode for a double-layer capacitor comprising:
mixing a paste comprising
starting substances for an active material;
a conductive additive material in an amount that is in the range of from 2.5 to 15% by weight of the electrode material, said conductive additive material comprising electrically conductive particles of carbon having an average particle diameter from 1 to 20 μm and containing mesopores and macropores forming a three-dimensional pore structure of interconnected pores, wherein pores with a pore diameter of 10 to 1000 nm make up a cumulative pore volume of more than 0.2 cm$^3$/g, and wherein the carbon particles have a microporosity of less than 20% based on a pore volume with pore sizes up to a maximum of 1000 nm, and
a binder spreading the paste.

* * * * *